US00RE46461E

(19) United States
(12) Reissued Patent
Sauder et al.

(10) Patent Number: US RE46,461 E
(45) Date of Reissued Patent: Jul. 4, 2017

(54) SEED SINGULATOR

(71) Applicants: Precision Planting LLC, Tremont, IL (US); Leann Rocke, Tremont, IL (US)

(72) Inventors: Gregg A. Sauder, Tremont, IL (US); Derek A. Sauder, Tremont, IL (US); Justin L. Koch, Deer Creek, IL (US); Chad E. Plattner, Tremont, IL (US)

(73) Assignee: Precision Planting LLC, Tremont, IL (US)

(21) Appl. No.: 14/658,971

(22) Filed: Mar. 16, 2015

Related U.S. Patent Documents

Reissue of:
(64) Patent No.: 7,699,009
Issued: Apr. 20, 2010
Appl. No.: 12/064,059
PCT Filed: Aug. 17, 2006
PCT No.: PCT/US2006/032256
§ 371 (c)(1),
(2) Date: Jun. 3, 2008
PCT Pub. No.: WO2007/024646
PCT Pub. Date: Mar. 1, 2007

U.S. Applications:
(63) Continuation of application No. 13/451,386, filed on Apr. 19, 2012, now Pat. No. Re. 45,412, which is an application for the reissue of Pat. No. 7,699,009.
(Continued)

(51) Int. Cl.
*A01C 7/00* (2006.01)
*A01C 9/00* (2006.01)
*A01C 7/04* (2006.01)

(52) U.S. Cl.
CPC ..... *A01C 7/046* (2013.01)

(58) Field of Classification Search
CPC ..... A01C 7/046
(Continued)

(56) References Cited

U.S. PATENT DOCUMENTS 3,627,050 A 12/1971 Hansen ..... 111/184
3,888,387 A 6/1975 Deckler ..... 221/278
(Continued)

FOREIGN PATENT DOCUMENTS

DE 2011462 9/1971
DE 2011462 A1 9/1971
(Continued)

OTHER PUBLICATIONS

S. I. Distributing Inc. "Successful Innovations for Agriculture". http://www.sidist.com/product.asp?is=2 Mar. 30, 2007.
John Deere and Company, "Double eliminator for Pro-Series™ vacuum meters". https://jdparts.deere.com/partsmkt/document/english/pmac/9673_fb_DoubleEliminatorProSeriesVacMeters . . . Mar. 30, 2007.

*Primary Examiner* — William Doerrler
(74) *Attorney, Agent, or Firm* — Thomas J. Oppold; Larkin Hoffman Daly & Lindgren, Ltd.

(57) ABSTRACT

A seed singulator for use with a vacuum disk having a seed face and a shoulder. The seed singulator has a first member and a second member supported by biasing members. The first member has upper lobes disposed at a radius of curvature slightly less than the outside radius of a row of apertures on a seed plane of the vacuum disk. The seed member has lower lobes disposed at a radius of curvature slightly greater than the inside radius than the row of apradius. The biasing members permit the lobes to move with the seed plane and the shoulder as the vacuum disk rotates thereby maintaining their position with respect to the apertures.

21 Claims, 7 Drawing Sheets

Related U.S. Application Data

(60) Provisional application No. 60/710,014, filed on Aug. 19, 2005.

(58) Field of Classification Search
USPC ..... 111/185, 184, 183, 177
See application file for complete search history.

(56) References Cited

U.S. PATENT DOCUMENTS

| | | | | | |
|---|---|---|---|---|---|
| 3,990,606 | A | | 11/1976 | Gugenhan | 221/211 |
| 4,469,244 | A | | 9/1984 | Maury | |
| 4,579,251 | A | | 4/1986 | Gugenhan | |
| 5,170,909 | A | | 12/1992 | Lundie et al. | 221/211 |
| 5,535,917 | A | * | 7/1996 | Ribouleau | 221/211 |
| 5,842,428 | A | | 12/1998 | Stufflebeam et al. | 111/185 |
| 6,109,193 | A | * | 8/2000 | Crabb et al. | 111/185 |
| 7,093,548 | B2 | | 8/2006 | Eben et al. | 111/185 |
| 7,152,542 | B2 | | 12/2006 | Eben et al. | 111/185 |
| 2005/0150442 | A1 | | 7/2005 | Friesen | |
| 2005/0204972 | A1 | | 9/2005 | Eben et al. | |

FOREIGN PATENT DOCUMENTS

| | | | |
|---|---|---|---|
| EP | 106299 | A1 | 4/1984 |
| EP | 106299 | B1 | 2/1986 |

* cited by examiner

SEED SINGULATOR

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

*CROSS-REFERENCE TO RELATED APPLICATIONS*

*This is a continuation reissue of Reissue application Ser. No. 13/451,386, filed Apr. 19, 2012, now Reissue U.S. Pat. No. Re. 45,412, which is a broadening reissue of U.S. Pat. No. 7,699,099, issued Apr. 20, 2010, which is a national stage of International Application No. PCT/US2006/032256, filed Aug. 17, 2006, which claims the benefit of U.S. Provisional Application No. 60/710,014, filed Aug. 19, 2005.*

BACKGROUND OF THE INVENTION

It is well recognized that proper and uniform spacing of seed in the furrow is essential to maximizing crop yield. The first step in achieving uniform spacing is to accurately dispense one seed and one seed only at the proper timing. This "singulation" accuracy is a performance benchmark that is well known for many types of seed meters, whether mechanical or pneumatic, and is often tested on a seed meter test stand prior to the beginning of the planting season.

There are many different manufacturers of pneumatic seed meters which fall into the more specific categories of air meters and vacuum meters. An example of one type of commercially successful air meter is disclosed in U.S. Pat. No. 3,888,387 to Decider. An example of one type of commercially successful vacuum meter is disclosed in U.S. Pat. No. 5,170,909 to Lundie et al. Other commercially successful vacuum meters include those disclosed in U.S. Pat. No. 5,842,428 to Stufflebeam et al., U.S. Patent Publication No. 20050204972 to Eben et al., and U.S. Pat. No. 3,990,606 to Gugenhan. Many of these meters have historically operated at performance levels of 93% to 97% accuracy. Recent improvements to vacuum meters have allowed them to operate at a typical accuracy of 98 to 99%. The vacuum meter is capable of 99% singulation on some seed types but has been plagued with the need for adjustment in order to attain that performance. Secondly, the particular design of many of these meters has made them susceptible to reduced performance levels as a result of manufacturing tolerances.

A problem affecting singulation accuracy with vacuum meters that utilize "celled-disks" (i.e., disks with indentations or "cells" around each aperture in the disk, such as the disks disclosed in U.S. Pat. No. 5,170,909 to Lundie et al.), is that such meters have a higher tendency to plant "skips" and "doubles" in near succession when planting flat shaped seeds. Despite this tendency, however, celled-disk vacuum meters offer the unique advantage of permitting the meter to generally operate at lower vacuum levels than meters that use flat or non-celled disks (i.e., vacuum disks with apertures only) because the indentations or cells assist in holding the seeds in place, thus requiring less vacuum pressure to entrain the seeds.

In an attempt to improve singulation accuracy, farmers have tried to use non-celled disks with meters originally designed for celled-disk meters. For example, with the John Deere MaxEmerge vacuum meters, farmers started using one of the specialty disks designed by John Deere for planting irregular seeds such as sweet corn (thus, this disk is often referred to as the "sweet corn disk"). The sweet corn disk is flat on the planting surface and does not have any indentations or cells to hold the seed. Similar to the sweet corn disk, an update kit, known as the Accu-Vac Update Kit, available from S.I. Distributing, Inc. St. Marys, Ohio, utilizes a flat, non-celled disk. The Accu-Vac disk has larger apertures in order to ensure the seeds are adequately entrained so they do not prematurely slough-off as the disk rotates. While the sweet corn disk and the Accu-Vac disk have markedly increased singulation performance when used in place of celled-disk, both have resulted in a system that requires very tedious adjustments by the planter operator in order to achieve optimum performance. Furthermore, the design of this meter and the nature of disks to warp over time has resulted in difficulty in keeping the double eliminator in proper alignment with the disk.

Other vacuum seed meters such as disclosed in U.S. Pat. No. 3,990,606 to Gugenhan have relied upon the flat disk with apertures and a seed stripping "singulator." These designs have provided for more repeatable and operator-friendly adjustments but the need still remains for adjustment. The meter disclosed in U.S. Pat. No. 5,842,428 to Stufflebeam et al. utilizes a flat disk and three spring loaded singulating spools that compensate for tolerances in one direction, but the spools do not compensate for radial translation of the disk.

Accordingly, there remains a need for a seed singulator that can be used with different types of meters and different types of seed disks, but which can deliver very high singulation accuracy while requiring minimal adjustments for seed type or manufacturing tolerances and wherein the singulation accuracy is not adversely effected by axial and radial translations of the disk.

SUMMARY

The present invention is directed to a seed singulator for use with a vacuum disk having a seed face and a shoulder. The seed singulator has a first member and a second member supported by biasing members. The first member has upper lobes disposed at a radius of curvature slightly less than the outside radius of a row of apertures on a seed plane of the vacuum disk. The seed member has lower lobes disposed at a radius of curvature slightly greater than the inside radius than the row of apradius. The biasing members permit the lobes to move with the seed plane and the shoulder as the vacuum disk rotates thereby maintaining their position with respect to the apertures.

DETAILED DESCRIPTION

Figure 1:
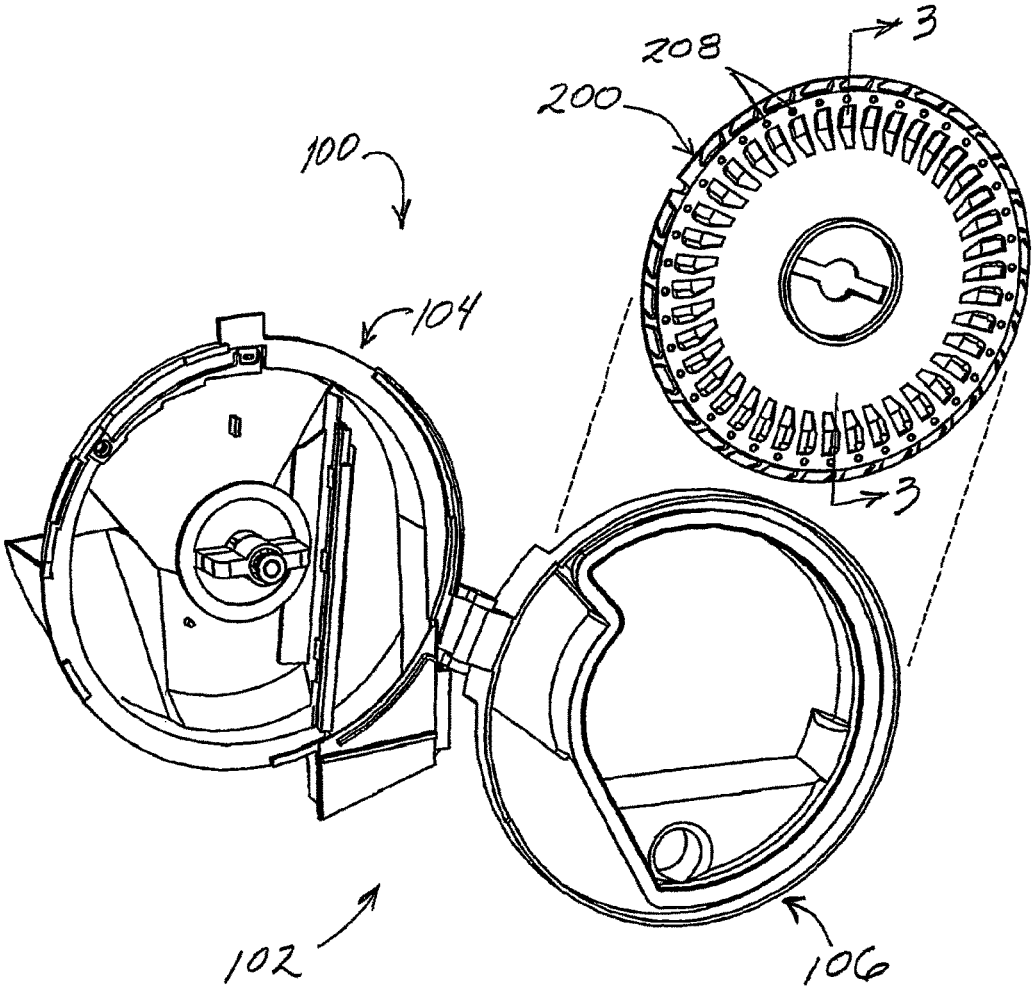
FIG. 1 is a partially exploded perspective view of the conventional vacuum meter utilizing a flat non-celled disk.

Referring now to the drawings, wherein like reference numerals designate identical or corresponding parts throughout the several views, FIG. 1 shows an exploded perspective view of a conventional vacuum meter 100, such as the John Deere MaxEmerge® vacuum meter, which is disclosed in U.S. Pat. No. 5,170,909 to Lundie et al., incorporated herein in its entirety by reference. The John Deere MaxEmerge vacuum meter [10] *100* is generally designed for use with a celled disk, but in FIG. 1, the celled disk has been replaced with a flat non-celled disk 200 such as the sweet corn disk or Accu-Vac disk previously described. The disk 200 is rotatably mounted within a housing 102. The housing 102 includes a back cover 104 and a front cover 106.

Figure 2:
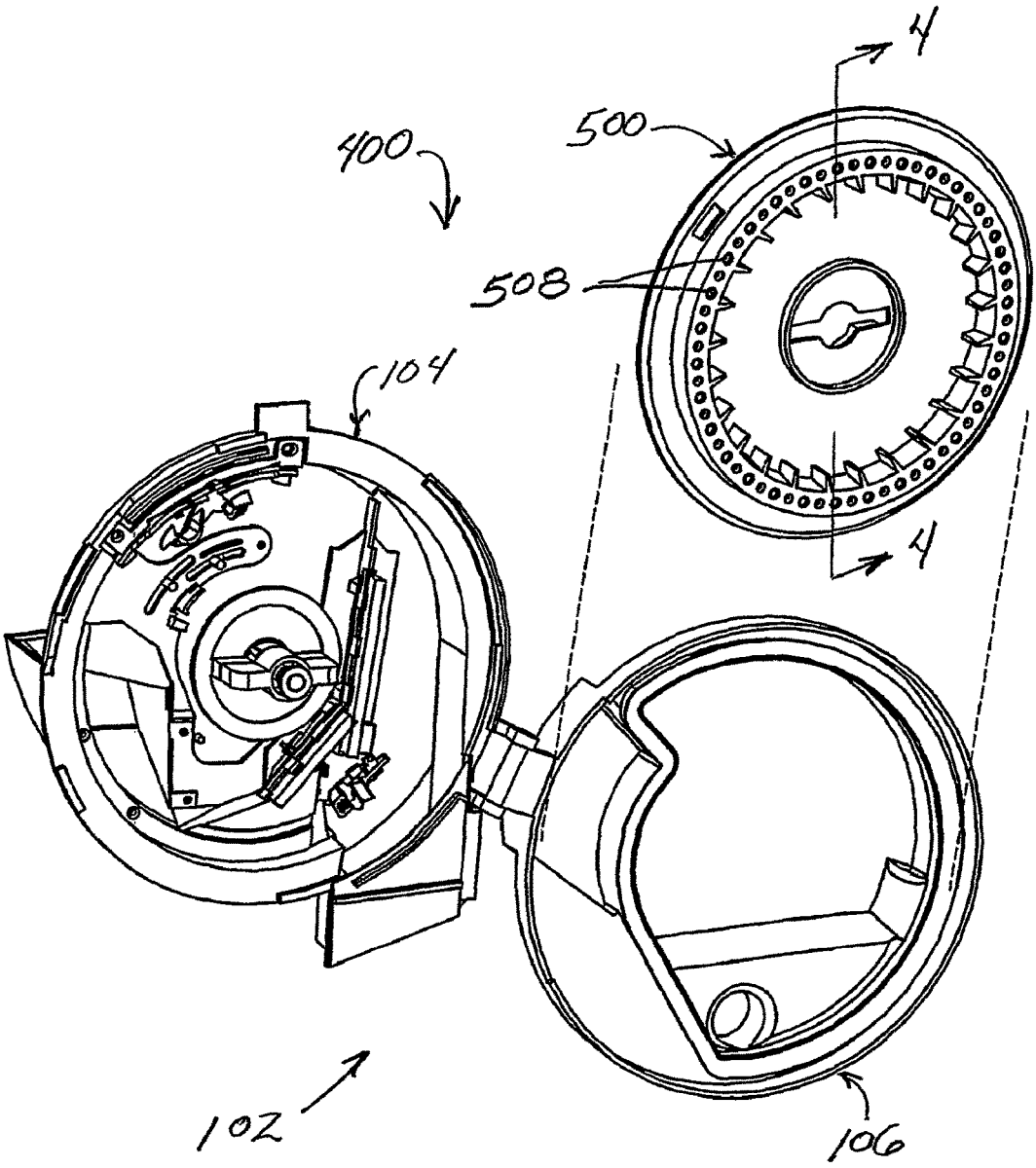
FIG. 2 is a partially exploded perspective view of an offset disk type vacuum seed meter.
Figure 3:
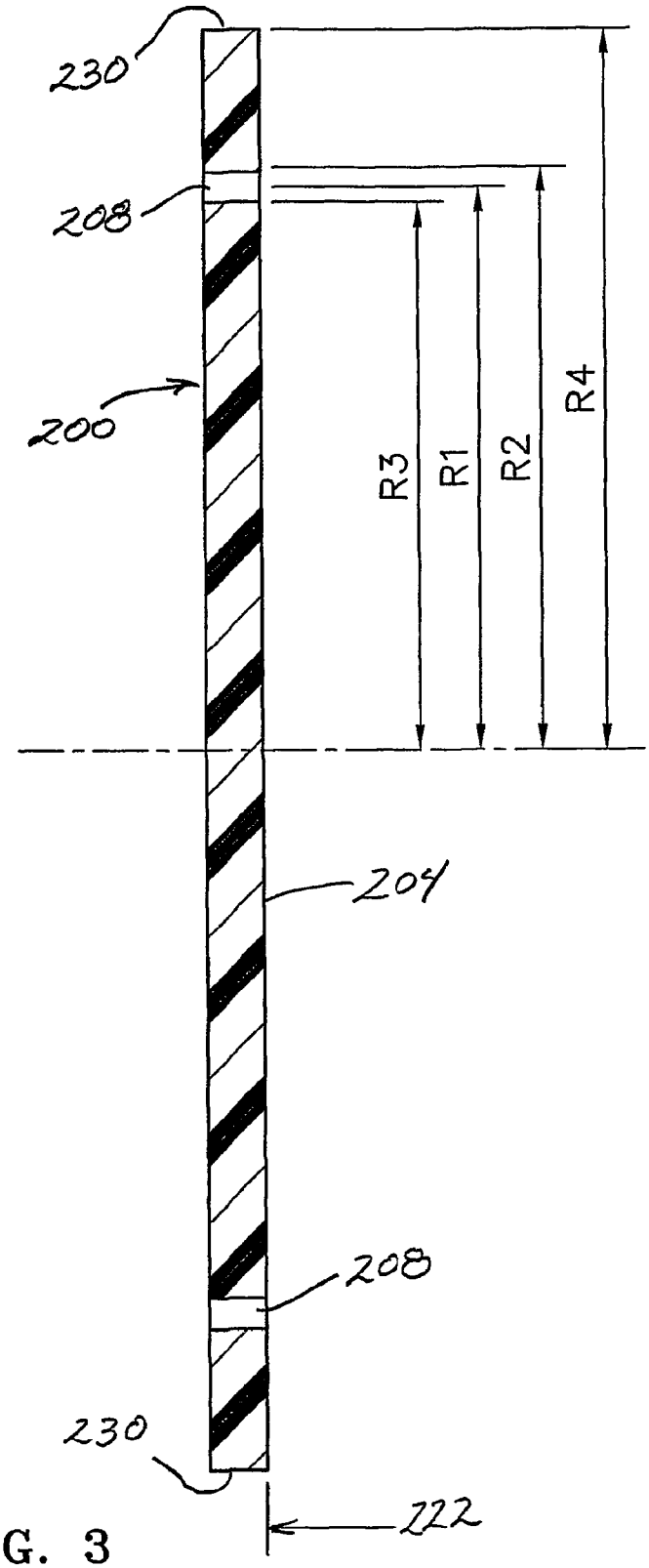
FIG. 3 is a cross-sectional view of a conventional flat disk as viewed along lines 3-3 of FIG. 1.
Figure 4:
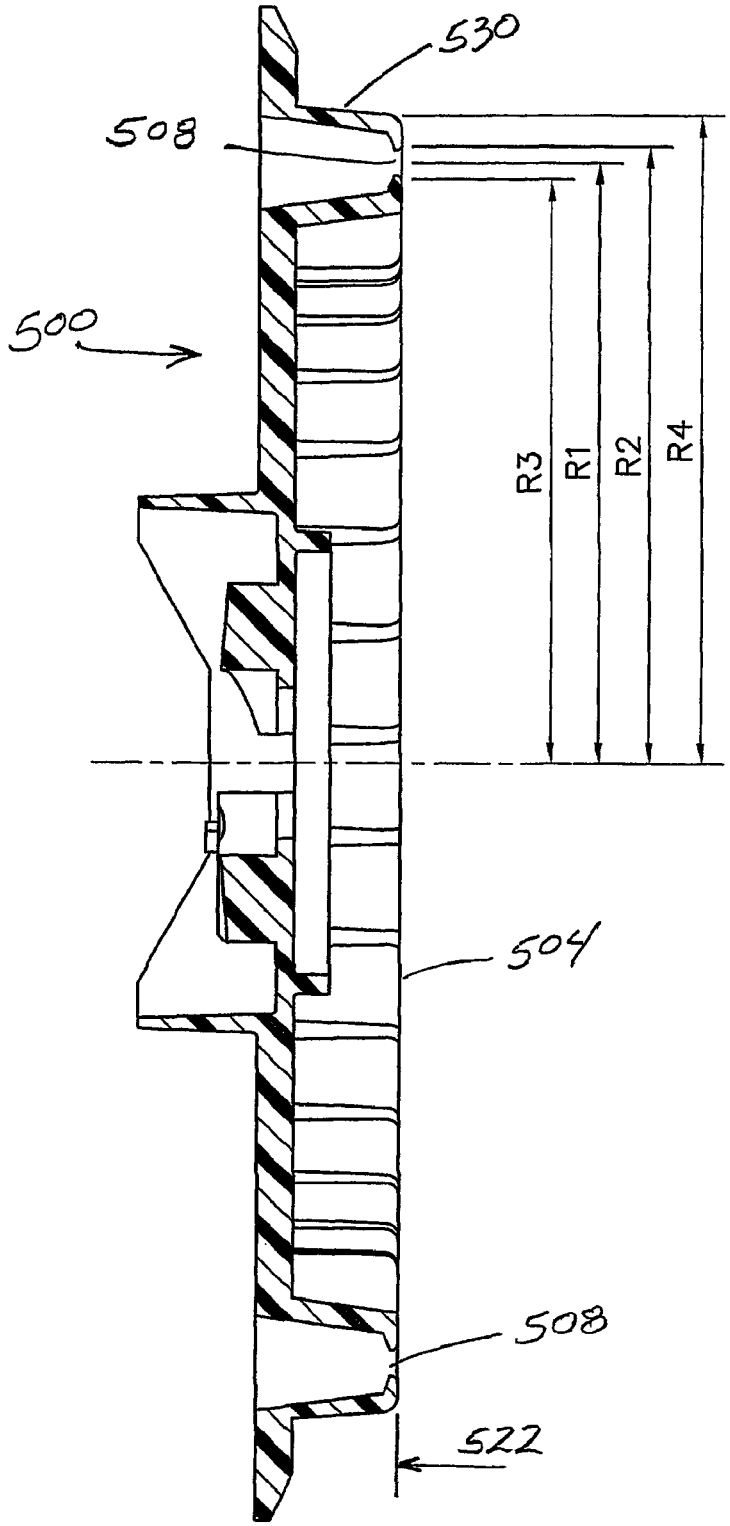
FIG. 4 is a cross-sectional view of an offset disk as viewed along lines 4-4 of FIG. 2.

FIG. 2 shows a partially exploded view of vacuum meter 400 that is substantially the same as the vacuum meter 100 as illustrated in FIG. 1 except that the flat-disk 200, is replaced by an offset disk 500. FIG. 3 is a cross-sectional view of the flat disk 200 as viewed along lines 3-3 of FIG. 1. FIG. 4 is a cross-sectional view of the offset disk 500 as viewed along lines 4-4 of FIG. 2.

As best illustrated in FIG. 3 the seed-side face 204 of the [offset] *flat-disk* disk 200 defines a seed plane 222. A plurality of apertures 208 are disposed around the seed plane 222 for entraining the seeds onto the face of the seed-side face 204 of the disk as it rotates through the seed pool within the vacuum meter housing 102. Depending on the type of seed to be planted, the apertures 208 may be equally radially spaced or the apertures 208 may comprise radially spaced groupings, or the apertures 208 may be disposed in multiple rows offset or radially aligned. In the embodiment of FIG. 1, the apertures are shown equally spaced around a radius R1, the outside radius of the apertures is referenced as R2, the inside radius of the apertures is referenced as R3. The disk 200 further includes a shoulder 230 disposed at a radius R4 from the centerline of the disk. The shoulder 230 may be the outer circumferential periphery of the disk 200 as illustrated in FIG. 3, or the [should] *shoulder* 230 may be radially inward from the circumferential outer periphery of the disk, similar to the offset disk 500 but with a flat face and a less pronounced offset.

As best illustrated in FIG. 4 the seed-side face 504 of the offset disk 500 preferably comprises two primary planes offset from each other, the base plane 520, and the seed plane 522. The seed plane 522 is a raised planar surface extending from the base plane 520 by inner conical side wall 526 and an outer cylindrical sidewall 528 defining a cylindrical shoulder 530. As with the flat disk 200, the offset disk 500 includes a plurality of apertures 508 for entraining the seeds onto the face of the disk as it rotates through the seed pool within the vacuum meter housing. Depending on the type of seed to be planted, the apertures 508 may be equally radially spaced or the apertures 508 may comprise radially spaced groupings, or the apertures 508 may be disposed in multiple rows offset or radially aligned. In the embodiment of FIG. 2, the apertures are shown equally spaced around a radius R1, the outside radius of the apertures is referenced as R2, the inside radius of the apertures is referenced as R3 and the radius of the cylindrical shoulder 530 is referenced as R4.

Figure 5:
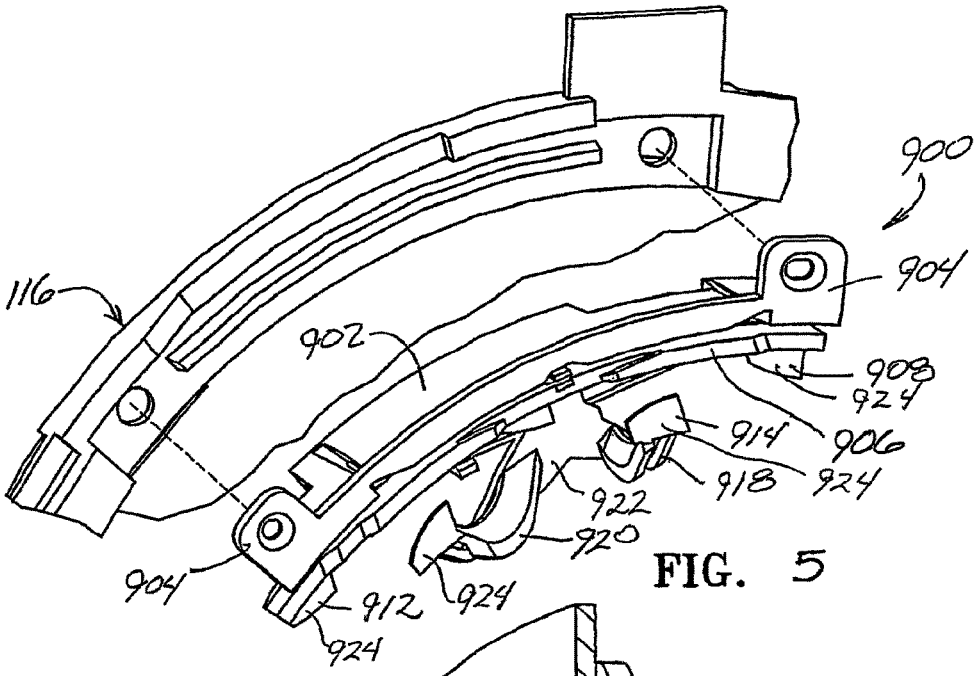
FIG. 5 is an exploded perspective view of a preferred embodiment of the seed singulator of the present invention shown being mountable to the back cover of a conventional vacuum meter housing.
Figure 6:
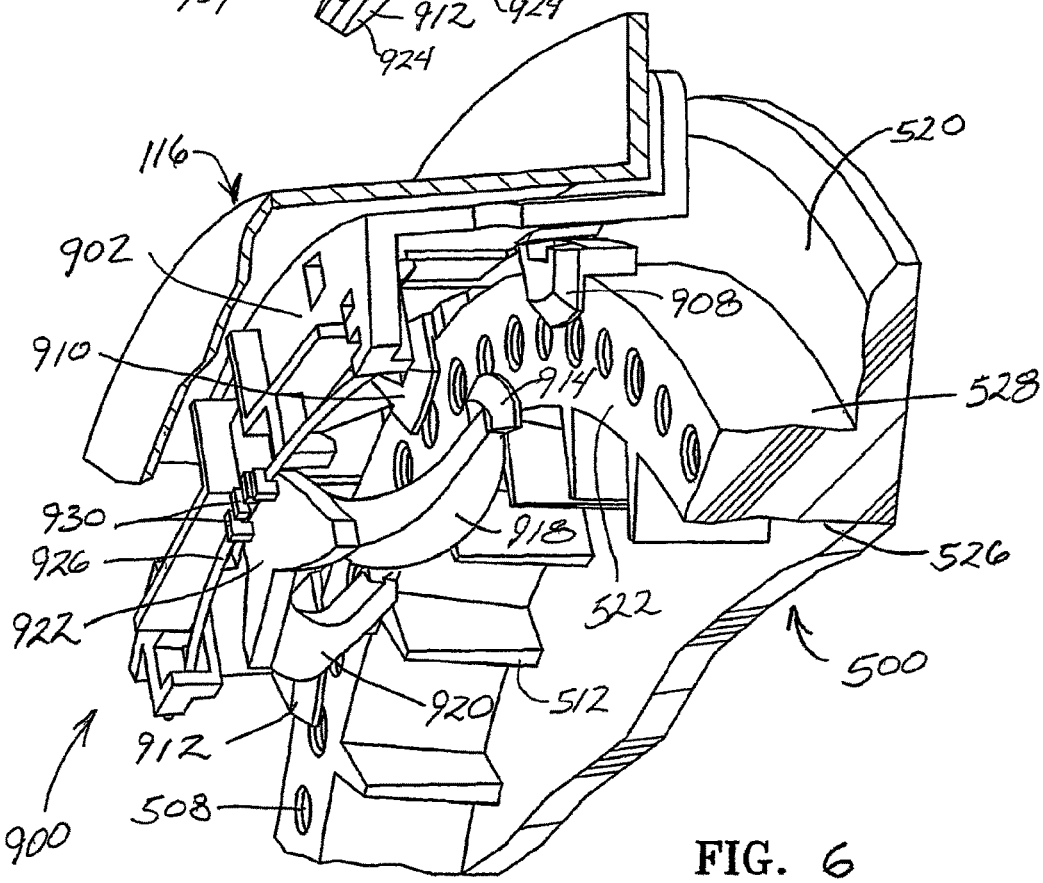
FIG. 6 is a detailed perspective view showing the singulator assembly of FIG. 5 in use on an offset disk.

A preferred embodiment of a seed singulator assembly 900 is shown in FIG. 5 as being mountable to a back cover 104 of a conventional vacuum meter housing 102. FIG. 6 illustrates the seed singulator assembly 900 disposed on an offset disk 500. The singulator assembly 900 includes a singulator base 902 which is preferably mountable in a conventional manner to the back cover 104 of the vacuum meter housing 102 through two mounting ears 904. The base 902 provides a secure platform from which the other components comprising the singulator assembly 900 are supported.

It is known that singulation performance improves with an increasing number of times that the seeds are contacted by the singulating lobes. It has been determined that superior singulation accuracy is achieved by bumping or agitating the seeds from both the top side (i.e., the outside radius R of the apertures) and the bottom side (i.e., the inside radius R3 of the apertures). For example, if a singulator is used that only bumps the seeds from the top side, then some seeds multiples may be able to "hang" on the very bottom of the aperture and would not be stripped or removed by the top singulator. Furthermore, it has been found that singulation can be best achieved when the seed is contacted three times from the top side of the apertures 208, 508 relative to the path of travel and two times from the bottom side of the apertures 208, 508.

Accordingly, in the preferred embodiment, a rail 906 supports three lobes 908, 910, 912. As illustrated in FIG. 6, these three lobes 908, 910, 912 are disposed on the top side of the apertures 508. The rail 906 has an inner face 913 having a radius of curvature that is preferably substantially the same or slightly larger than the radius R4 of the shoulder 230, 530. Continuing to refer to FIG. 6, two bottom lobes 914, 916 are preferably supported by two divergent arms 918, 920 preferably extending from an L-shaped bracket 922 connected to the rail 906. The bottom lobes 914, 916 are also preferably made of a wear resistant and durable material such as metal or brass using the investment casting or metal injection molding process. Each of the lobes 908, 910, 912, 914, 916 has a surface 924 that is co-planar with the other lobes. As shown in FIG. 6 each of these co-planar surfaces 924 is disposed adjacent the seed plane 522 of the offset disk 500. For the flat disk 200, each of these co-planar surfaces 924 would be disposed adjacent the seed plane 222 of the flat disk 200.

Figure 7:
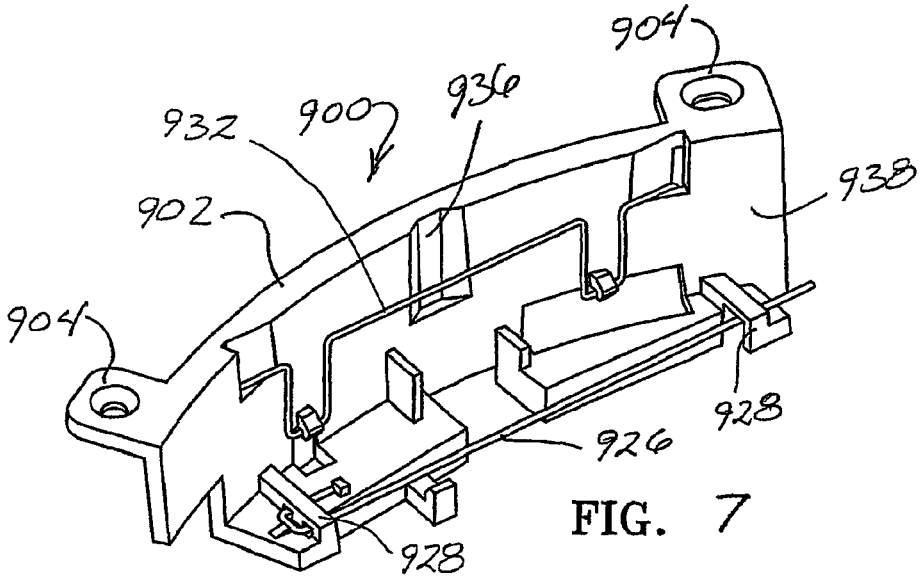
FIG. 7 is a perspective view of a preferred embodiment of a base for the seed singulator of FIG. 5.

Referring to FIG. 7, in the preferred embodiment, a first wire 926 is supported at each end by tabs or slots *928* in the base 902. As illustrated in FIG. 7, this first wire 926 is preferably received within hooks 930 disposed on the L-shaped bracket 922. This first wire 926 serves as an axial spring which biases the co-planar surfaces 924 of the lobes 908, 910, 912, 914, 916 against or in contact with the seed plane 222, 522 of the disk 200, 500.

Figure 9:
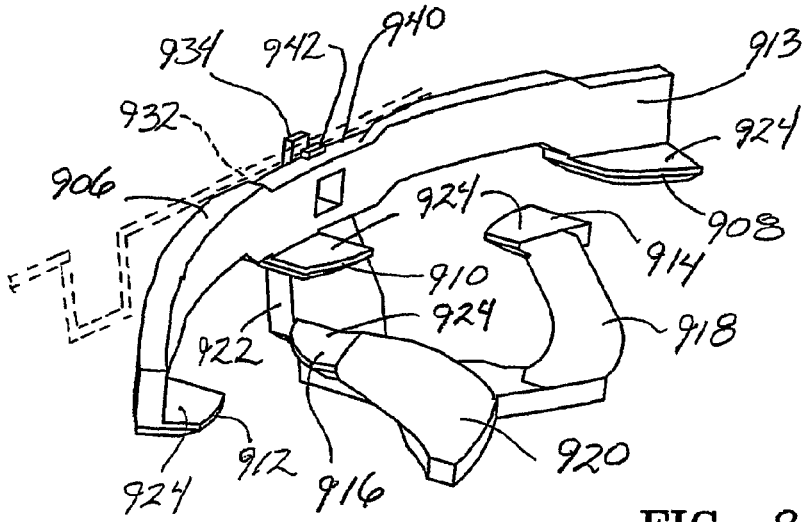
FIG. 9 is a bottom perspective view of the rail for the seed singulator of FIG. 5.

Continuing to refer to FIG. 7, a second wire 932 is secured at or near its ends to the base 902. Disposed on the back side of the rail 906 is a tongue 934 which is receivable by and is slidable within a groove 936 formed in the top wall 938 of the base 902. The tongue 934 within the groove 936 also receives the second wire 932 as best illustrated in FIG. 9. Thus, the second wire 932 serves as a radial spring which biases the inner face 913 of the rail 906 against the top or outside diameter of the shoulder 230, 530.

Figure 10:
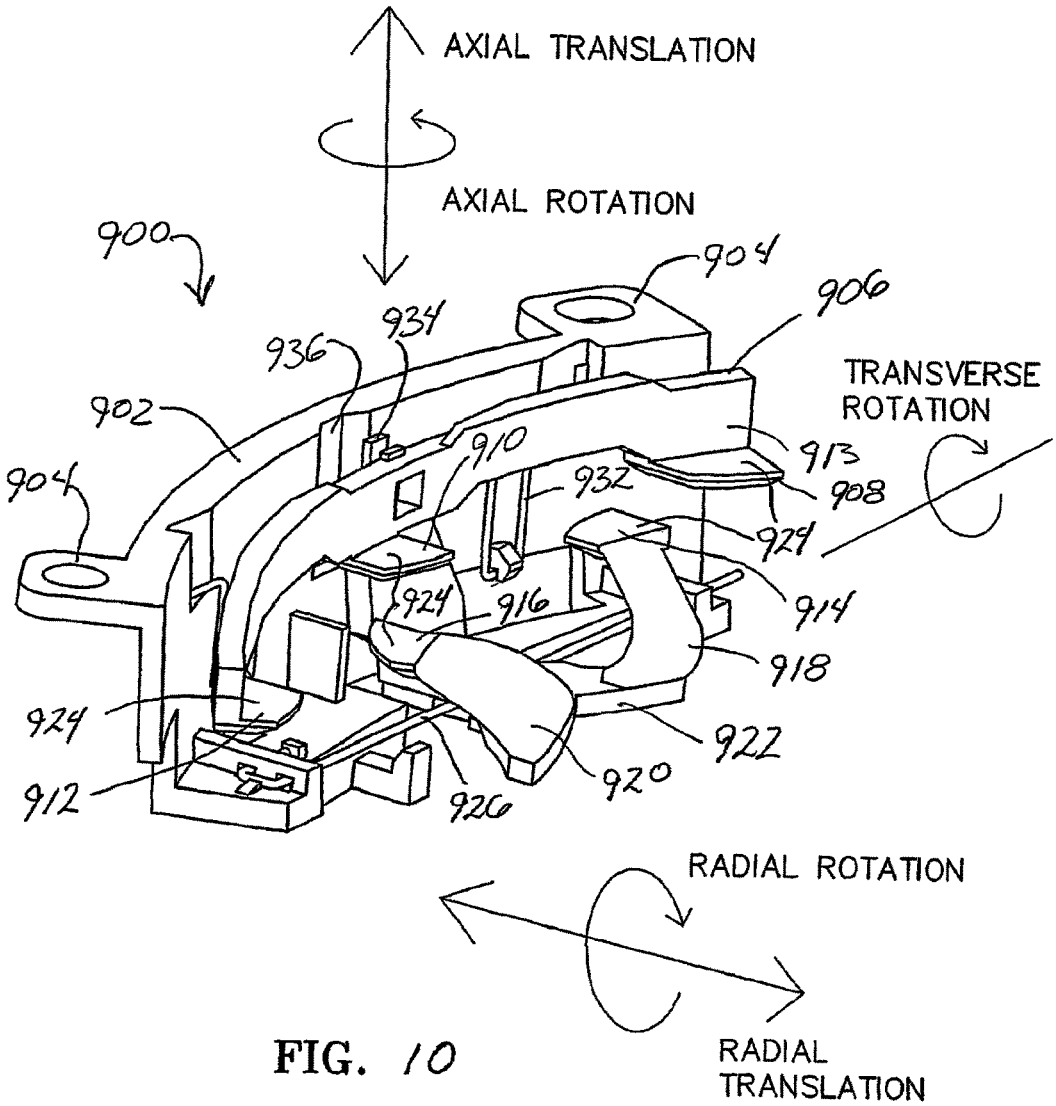
FIG. 10 is a perspective view of the seed singulator of FIG. 5 illustrating the various degrees of freedom that can be achieved by the preferred embodiment.

It should be appreciated that the preferred embodiment permits the lobes 908, 910, 912, 914, 916 to "float" with the seed plane 222, 522 and the shoulder 230, 530 of the disk 200, 500. This ability to float provides inherent advantages. For example, during rotation, the disk 200, 500 may translate about the central axis due to warping, or as a result of the bearing or hub being out of alignment, or possibly due to bending or flexing of the disk 200, 500 caused by the pressure differential between the seed-side face and the vacuum side face of the disk. Additionally, the disk 200, 500 may be subject to radial translation caused by improper hub alignment, mounting tolerances or disk eccentricities associated with the manufacturing process or manufacturing tolerances. FIG. 10 illustrates the various degrees of freedom that is provided by the foregoing spring biased suspension system of the seed singulator assembly 900.

Thus, by providing a singulator with lobes that float and remain in contact with the seed plane 222, 522 and/or in contact with the top of the shoulder 230, 530, the singulator assembly 900 is able to compensate for both radial translation and axial translation and radial rotation of the disk, while the amount of coverage of the apertures [108.] 208, 508 by the passing lobes 908, 910, 912, 914, 916 remains constant regardless of the movement of the disk 200, 500. Additionally, the spring biased suspension of the lobes permits the lobes to flex away from the apertures 208, 508 in the case a seed or fragment becomes stuck in the aperture. This flexure prevents adverse wear to the surfaces 924 and edges of the lobes and also improves performance by preventing sudden jerking of the disk due to seeds wedging between an inflexible or immovable singulator and the aperture.

Figure 8:
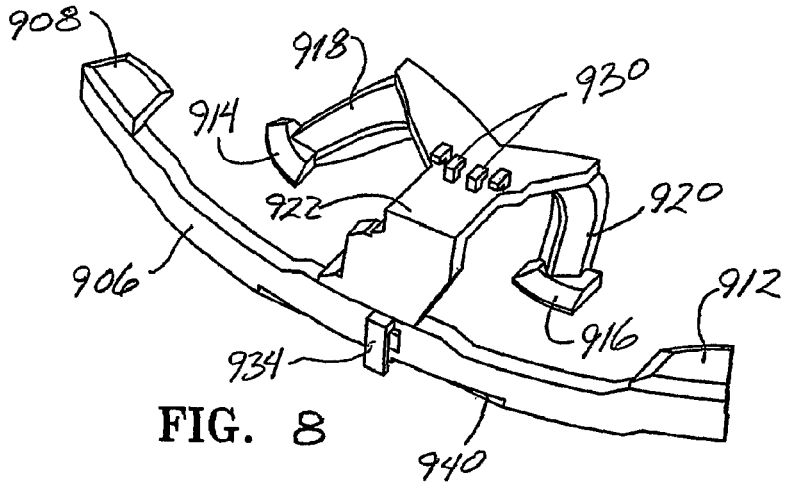
FIG. 8 is a top perspective view of a preferred embodiment of the rail for the seed singulator of FIG. 5.

A further advantage of the preferred embodiment of the spring suspension system of the singulator 900 is that the singulator assembly 900 need not be removed when switching from the offset disk 500 to a celled (with which a singulator is not generally used). Instead, in the preferred embodiment, the rail 906 is capable of being locked into a depressed position whereby the lobes 908, 910, 912, 914, 916 will not contact the seed-side face [104] *204, 504* of the disk [100] *200, 500*. Referring to FIGS. 7, 8 and 9, a groove 940 is formed in the top side edge of the rail 906. A tab 942 also projects from the top side edge of the rail 906. By depressing the rail 906 downwardly and rearwardly relative to the base 902, the tab 942 can be forced behind the second wire 932 such that the second wire 932 locks the rail in place in the downward or depressed position with the second wire 932 disposed on the top edge of the rail 906 and resting groove 940.

The foregoing description is presented to enable one of ordinary skill in the art to make and use the invention and is provided in the context of a patent application and its requirements. Various modifications to the preferred embodiment of the singulator assembly, such as the various alternative embodiments disclosed in co-pending U.S. Provisional Application No. 60/710,014 incorporated herein in its entirety, and the general principles and features described herein will be readily apparent to those of skill in the art. Thus, the present invention is not to be limited to the embodiments of the apparatus and methods described above and illustrated in the drawing figures, but is to be accorded the widest scope consistent with the spirit and scope of the appended claims.

The invention claimed is:

[1. In combination, a seed singulator and a vacuum disk, the vacuum disk having a seed plane and a row of apertures at a radius R1 from the center of the disk, a radius R2 to the outside of the apertures, a radius R3 to the inside of the apertures, and a radius R4 to an annular shoulder of the vacuum disk, said singulator comprising:

a first member having upper lobes disposed at a radius of curvature slightly less than the radius R2, said first member further having a surface biased radially toward the annular shoulder of the vacuum disk;

a second member having lower lobes disposed at a radius of curvature slightly greater than the radius R3;

said upper and lower lobes having substantially co-planar is surfaces biased axially against the seed plane of the vacuum disk.]

[2. The combination of claim 1 wherein said singulator includes three upper lobes and two lower lobes.]

[3. The combination of claim 1 wherein said surface of said first member of said singulator has a radius of curvature substantially the same as the radius R4.]

[4. The combination of claim 3 wherein said first member and said second member of said singulator comprise a single unitary element.]

[5. The combination of claim 4 wherein said singulator further includes an axial spring and a radial spring whereby said axial spring biases said single unitary element in a axial direction and said radial spring biases said single unitary element in a radial direction.]

[6. The combination of claim 4 wherein said upper lobes and said lower lobes move with the seed plane and with the shoulder while maintaining the position of the upper lobes with the radius R2 and the lower lobes with the radius R3.]

[7. The combination of claim 1 wherein said upper lobes and said lower lobes move with the seed plane and at least said upper lobes move with the shoulder while maintaining the position of the upper lobes with the radius R2.]

*8. A seed meter, comprising:*

*a seed disc having a plurality of seed apertures, said seed disc disposed to entrain seeds from a seed pool onto said seed apertures by vacuum; and*

*a singulator disposed to remove excess seeds from said seed apertures, said singulator disposed to resiliently slidingly contact said seed disc as said seed disc moves relative to said singulator, wherein said singulator is biased toward an axial center of said seed disc.*

*9. The seed meter of claim 8, wherein an arcuate singulator surface of said singulator is biased against and slidingly contacts an arcuate seed disc surface of said seed disc, wherein said arcuate singulator surface faces toward said axial center of said seed disc.*

*10. The seed meter of claim 8, further comprising: a seed side housing enclosing said seed pool; and a radial spring fixed to said singulator, wherein said singulator is biased toward said axial center of said seed disc by a force transmitted to said seed side housing.*

*11. The seed meter of claim 8, wherein said radial spring comprises a metal wire.*

*12. A seed meter, comprising:*

*a seed disc having a plurality of seed apertures, said seed disc disposed to entrain seeds from a seed pool onto said seed apertures by vacuum; and*

*a singulator disposed to remove excess seeds from said seed apertures, said singulator disposed to resiliently slidingly contact said seed disc as said seed disc moves relative to said singulator, wherein said singulator is*

*biased toward said seed disc along a direction parallel to a rotational axis of said seed disc.*

*13. The seed meter of claim 12, further comprising: a seed side housing enclosing said seed pool; and an axial spring fixed to said singulator, wherein said singulator is biased toward said axial center of said seed disc by a force transmitted to said seed side housing.*

*14. The seed meter of claim 13, wherein said singulator is fixed to said axial spring, and wherein said axial spring supports a weight of said singulator when said seed disc is removed from the seed meter.*

*15. A seed meter, comprising:*

*a seed disc having a plurality of seed apertures, said seed disc disposed to entrain seeds from a seed pool onto said seed apertures by vacuum; and*

*a singulator disposed to remove excess seeds from said seed apertures, said singulator disposed to resiliently slidingly contact said seed disc as said seed disc moves relative to said singulator, wherein a center of each said seed aperture is disposed at an aperture radius from a rotational axis of said seed disc, wherein said singulator comprises a first upper lobe disposed at an upper lobe radius from said rotational axis of said seed disc, said upper lobe radius being greater than said aperture radius, wherein said first upper lobe contacts seeds on said seed apertures, and wherein said singulator comprises a first lower lobe disposed at a lower lobe radius from said rotational axis of said seed disc, said lower lobe radius being less than said aperture radius, wherein said first lower lobe contacts seeds on said seed apertures.*

*16. The seed meter of claim 15, wherein said singulator comprises a second lower lobe disposed at said lower lobe radius, wherein said second lower lobe contacts seeds on said seed apertures.*

*17. The seed meter of claim 16, wherein said first upper lobe contacts seeds on said seed apertures before said first lower lobe contacts seeds on said seed apertures.*

*18. The seed meter of claim 16, wherein said singulator comprises a second upper lobe disposed at said upper lobe radius, wherein said second upper lobe contacts seeds on said seed apertures.*

*19. A seed meter, comprising:*

*a seed disc having a plurality of seed apertures, said seed disc disposed to entrain seeds from a seed pool onto said seed apertures by vacuum; and*

*a singulator disposed to remove excess seeds from said seed apertures, said singulator disposed to resiliently slidingly contact said seed disc as said seed disc moves relative to said singulator, wherein a center of each said seed aperture is disposed at an aperture radius from a rotational axis of said seed disc, wherein said singulator comprises a first upper lobe disposed at an upper lobe radius from said rotational axis of said seed disc, said upper lobe radius being greater than said aperture radius, wherein said first upper lobe contacts seeds on said seed apertures, and wherein said first upper lobe comprises a lower lobe arcuate edge, said lower lobe arcuate edge curved away from approaching seeds on said seed apertures.*

*20. The seed meter of claim 15, wherein said first lower lobe comprises an upper lobe arcuate edge, said upper lobe arcuate edge curved away from approaching seeds on said seed apertures.*

*21. The seed meter of claim 16, wherein said first upper lobe and said first lower lobe each comprise a leading edge, said leading edge being in a swept-back orientation relative to the rotational direction of said seeds.*

*22. The seed meter of claim 16, wherein said first upper lobe and said first lower lobe each comprise a leading edge, said leading edge retreating along the direction of seed rotation as said leading edge extends toward the seed aperture radius.*

*23. The seed meter of claim 8, further including a plurality of cavities formed in said seed disc, said cavities extending radially inward of said seed apertures.*

*24. The seed meter of claim 15, further including a plurality of cavities formed in said seed disc, said cavities extending radially inward of said seed apertures.*

*25. The seed meter of claim 8, further including a plurality of fins formed in said seed disc, said fins extending radially inward of said seed apertures.*

*26. The seed meter of claim 15, further including a plurality of fins formed in said seed disc, said fins extending radially inward of said seed apertures.*

*27. A seed meter, comprising:*

*a seed disc having a plurality of seed apertures, said seed disc disposed to entrain seeds from a seed pool onto said seed apertures by vacuum; and*

*a singulator disposed to remove excess seeds from said seed apertures, said singulator disposed to resiliently slidingly contact said seed disc as said seed disc moves relative to said singulator, wherein said seed disc includes a radially symmetrical surface, said radially symmetrical surface normal to a rotational axis of said seed disc, said radially symmetrical surface disposed radially outward of said seed apertures, said seed apertures elevated relative to said radially symmetrical surface along a direction parallel to said rotational axis.*

*28. The seed meter of claim 15, wherein said seed disc includes a radially symmetrical surface, said radially symmetrical surface normal to a rotational axis of said seed disc, said radially symmetrical surface disposed radially outward of said seed apertures, said seed apertures elevated relative to said radially symmetrical surface along a direction parallel to said rotational axis.*

* * * * *